G. OSTEN.
PIPE STEM AND MOUTHPIECE.
APPLICATION FILED OCT. 17, 1910.
997,578.
Patented July 11, 1911.
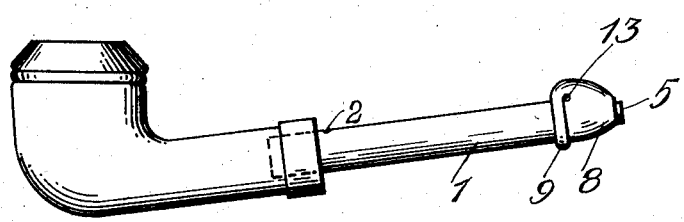
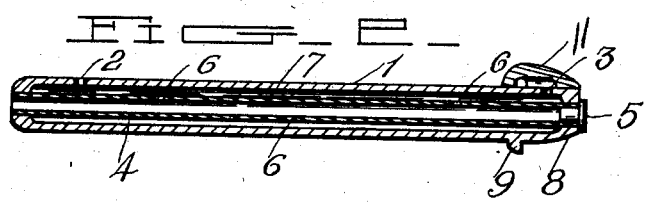
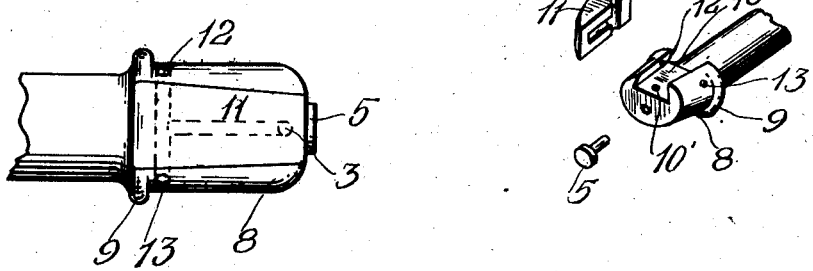
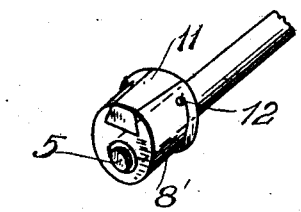
Witnesses
Inventor
George Osten
by *H. B. Willson & Co.*
Attorneys

UNITED STATES PATENT OFFICE.

GEORGE OSTEN, OF DENVER, COLORADO.

PIPE STEM AND MOUTHPIECE.

997,578. Specification of Letters Patent. Patented July 11, 1911.

Application filed October 17, 1910. Serial No. 587,471.

*To all whom it may concern:*

Be it known that I, GEORGE OSTEN, a citizen of the United States, residing at Denver, in the county of Denver and State of Colorado, have invented certain new and useful Improvements in Pipe Stems and Mouthpieces; and I do declare the following to be a full, clear, and exact description of the invention, such as will enable others skilled in the art to which it appertains to make and use the same.

This invention relates to an improved pipe stem and mouthpiece.

The object of the invention is to provide a simple and efficient pipe stem for cooling the smoke equipped with a mouthpiece constructed to prevent the saliva from entering the pipe.

Another object is to provide a mouthpiece which may be applied to the stem of any pipe already in use.

With these and other objects in view, the invention consists of certain novel features of construction, combination and arrangement of parts as will be more fully described and particularly pointed out in the appended claims.

In the accompanying drawings:—Figure 1 is a side elevation of a pipe equipped with this improved stem and mouthpiece; Fig. 2 is a longitudinal section through the stem and mouthpiece; Fig. 3 is a top plan view on an enlarged scale of the outer end of the stem showing the mouthpiece applied; Fig. 4 is a perspective view of the mouthpiece showing the parts thereof supported and arranged in juxtaposition ready for assembling, a portion only of the stem to which it is applied being shown; and Fig. 5 is a perspective view showing a detachable mouthpiece constructed in accordance with this invention applied, a portion of the stem only being shown.

In the embodiment illustrated in Figs. 1 to 4, a stem is shown composed of an outer tubular member 1 having a draft opening 2 extending through one wall near its inner end, and a smoke outlet 3 arranged near its outer end. The opposite ends of this member 1 are constructed to receive and closely fit a smaller inner tube 4 which extends throughout the length thereof and one end of which is adapted to communicate with the pipe bowl and the other to be closed by a removable plug 5. This tube 4 is provided with a plurality of apertures, as 6, through which the smoke passes to the cooling chamber 7, formed between the side walls of the tubes 1 and 4, as shown in Fig. 2, in which the smoke is thoroughly cooled before it passes out through the outlet 3.

A mouthpiece 8 is mounted on the outer end of the tube 1 being shown formed integral therewith in Figs. 1 to 4, and having an annular shoulder 9 formed at its base and a recess 10 in its outer face extending longitudinally from end to end thereof to receive a hollow wedge-shaped cap 11 preferably having a dovetailed connection with the mouthpiece. The opposite side walls of the recess are provided with smoke outlet apertures 12 and 13 which register with apertures as 14, extending through the side walls of the cap 11 and through which the smoke is drawn into the mouth of the user. In Fig. 4, the cap 11 is shown provided in its inner face with a T-shaped groove, the opposite ends of the arms of which open through the side walls of the cap, the stem being arranged longitudinally of the cap and adapted to register with an aperture 10′ formed in the mouthpiece, said aperture 10′ registering with the aperture 3 in the stem.

In Fig. 5, the mouthpiece 8′ is constructed similarly to the mouthpiece 8 of the other figures, except that it is detachably engaged with the pipe stem being made in the form of a hollow cap, the bore of which is designed to closely engage the stem and be held thereon by friction, the outer end of the stem being closed by a plug 5 in the manner above described to prevent the admission of saliva to the pipe. It is to be understood, that when this mouthpiece is applied to a pipe stem already in use, it will be necessary to bore an aperture through one wall of said stem near its outer end in position to register with the aperture 10′ in the mouthpiece.

In the operation of this improved pipe stem and mouthpiece, the smoke enters the tube 4 at its inner end and passes through said tube out through the apertures 6 therein into the cooling chamber 7 and then through the aperture 3 at its outer end into the mouthpiece, from which it is drawn through the apertures 14 in the cap 11, and 12 and 13 in the body of the mouthpiece, and is thus thoroughly cooled before it reaches the mouth of the user. The draft aperture 2 permits fresh outside air to be drawn into the cooling chamber and assists in cooling the smoke before it enters the mouth. The arrangement of the smoke outlet apertures 12 and 13 at the sides of the mouthpiece prevent the saliva from entering the pipe and the plug 5 may be readily removed and the stem cleaned out when necessary.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:—

1. A pipe stem having an aperture extending transversely through one wall thereof, a mouthpiece arranged on the outer end of said stem and having a recess in its outer face with an aperture extending through the lower wall of said recess in position to register with the aperture in said stem, and a hollow closure for said recess having an aperture through one side thereof, one side wall of said recess having an aperture arranged to register with the aperture in said closure.

2. The combination with a pipe stem having a smoke cooling chamber formed therein with an aperture extending through one wall thereof, a mouthpiece arranged on said stem over said aperture having a chamber formed in one wall thereof with an inlet communicating with the aperture in said stem, and a smoke outlet aperture opening from said chamber through one side wall of said mouthpiece.

3. The combination with a pipe stem having a smoke cooling chamber formed therein with an aperture extending through one wall thereof, a mouthpiece arranged on said stem over said aperture having a chamber formed in one wall thereof with an inlet communicating with the aperture in said stem, and smoke outlet apertures opening through the opposite side walls of said chamber in a plane at right angles to the bore of the stem.

4. A pipe stem comprising an outer tubular member having contracted opposite ends, an inner tube of the same diameter as said contracted ends, inserted in said outer tube with the side walls thereof spaced from the side walls of said outer tube to form a smoke cooling chamber, said inner tube having a plurality of smoke outlet apertures therein, said outer tube having an aperture near its outer end and having a smoke chamber communicating with said aperture, said chamber having smoke outlet apertures opening through the side walls thereof.

5. A pipe stem comprising an outer tubular member having contracted opposite ends, an inner tube inserted in said outer tube with the side walls thereof spaced from the side walls of said outer tube to form a smoke cooling chamber, said inner tube having a plurality of smoke outlet apertures therein, said outer tube having an aperture near its outer end and having a smoke chamber communicating with the aperture in said end, said chamber having smoke outlet apertures opening through the side walls thereof, and a removable element for closing the outer end of said inner tube.

In testimony whereof I have hereunto set my hand in presence of two subscribing witnesses.

GEORGE OSTEN.

Witnesses:
 JOSEPH F. ROSE,
 FRANK W. ELLIOTT.

---

Copies of this patent may be obtained for five cents each, by addressing the "Commissioner of Patents, Washington, D. C."